US006256014B1

(12) United States Patent
Thomas et al.

(10) Patent No.: US 6,256,014 B1
(45) Date of Patent: Jul. 3, 2001

(54) MOUSE RANKING SYSTEM FOR MULTIPLE USERS

(75) Inventors: Christopher L. Thomas, Madison; Douglas D. Reed, Meridianville; David H. Stafford; Mark M. Nicolas, both of Huntsville, all of AL (US)

(73) Assignee: Avocent Corporation, Huntsville, AL (US)

( * ) Notice: Subject to any disclaimer, the term of this patent is extended or adjusted under 35 U.S.C. 154(b) by 0 days.

(21) Appl. No.: 09/564,794

(22) Filed: May 5, 2000

Related U.S. Application Data
(60) Provisional application No. 60/132,926, filed on May 6, 1999.

(51) Int. Cl.[7] .................................................... G09G 5/08
(52) U.S. Cl. .......................... 345/163; 345/157; 710/131
(58) Field of Search ................................ 345/1, 157, 163, 345/168, 167, 161; 710/1, 2, 36, 62, 131, 244

(56) References Cited

U.S. PATENT DOCUMENTS 6,046,731 * 4/2000 Griffin et al. ......................... 345/168
6,072,482 * 6/2000 Moon et al. .......................... 345/333

* cited by examiner

Primary Examiner—Richard Hjerpe
Assistant Examiner—Alexander Eisen
(74) Attorney, Agent, or Firm—Nixon & Vanderhye P.C.

(57) ABSTRACT

A multi-user KVM switch system is disclosed in which the KVM switch utilizes a pre-determined routine to determine which types of mice are connected to the KVM switch user ports. When the multiple mice communicate with a common computer via the KVM switch, the present invention provides a hierarchical mouse ranking structure which the KVM switch 13 uses to determine which of the disparate mouse driver types the KVM switch will emulate to the commonly selected computer. In this manner, disparate mouse types speaking to a common KVM switch and to a commonly selected computer by a mouse emulation type which is advantageously selected from a hierarchical ranking of mouse types in flash memory of the KVM switch.

16 Claims, 6 Drawing Sheets

Mouse Functionality Ranking 30

| Mouse Type | Manufacturer 31 | Mouse/Trackball 32 | Buttons 33 | | | | | | Wheel 34 | | MW required 35 | Rank 36 |
|---|---|---|---|---|---|---|---|---|---|---|---|---|
| | | | L | R | M | Extra | Number | Y | X | | |
| MouseMan+ | Logitech | mouse | y | y | y | y | 4 | y | | IntelliPoint | 11 |
| Scroll Point | IBM/Logitech | mouse | y | y | y | | 3 | y | y | IntelliPoint | 10 |
| Marble+ | Logitech | trackball | y | y | y | | 3 | y | | IntelliPoint | 9 |
| Wheel Mouse | Logitech | mouse | y | y | y | | 3 | y | | IntelliPoint | 8 |
| Intellimouse | Microsoft | mouse | y | y | y | | 3 | y | | IntelliPoint MouseWare | 7 |
| Marble FX | Logitech | trackball | y | y | y | y | 4 | | | | 6 |
| Expert Mouse | Kensington | trackball | y | y | y | y | 4 | | | | 5 |
| Thinking Mouse | Kensington | mouse | y | y | y | y | 4 | | | | 4 |
| Marble Mouse | Logitech | trackball | y | y | y | | 2 | | | | 3 |
| Three Button | generic | mouse | y | y | y | | 3 | | | | 2(Default) |
| Serial | generic | mouse | y | y | | | 3 | | | | 1 |
| None | | | | | | | 0 | | | | 0 |

FIG. 4

| Highest Ranked Peripheral Mouse | Manufacturer | Mouse/ Trackball | # Buttons | Wheel Vert | Wheel Horz | IntelliPoint | MR or MW ? MouseWare | MR or MW ? MouseWorks | Rank |
|---|---|---|---|---|---|---|---|---|---|
| Explorer | Microsoft | mouse | 5 | y | | MW | MW | MR | 12 |
| MouseMan+ | Logitech | mouse | 4 | y | | MW | MR | MR | 11 |
| Scroll Point | IBM(Logitech) | mouse | 3 | y | y | MW | MR | MR | 10 |
| Marble+ | Logitech | trackball | 3 | y | | MW | MR | MR | 9 |
| Wheel Mouse | Logitech | mouse | 3 | y | | MW | MR | MR | 8 |
| Intellimouse | Microsoft | mouse | 3 | y | | MW | MW | MR | 7 |
| Marble FX | Logitech | trackball | 4 | | | MR | MR | MR | 6 |
| Expert Mouse | Kensington | trackball | 4 | | | MR | MR | MR | 5 |
| Thinking Mouse | Kensington | mouse | 4 | | | MR | MR | MR | 4 |
| Marble Mouse | Logitech | trackball | 2 | | | MR | MR | MR | 3 |
| Three Button | generic | mouse | 3 | | | MR | MR | MR | 2(Default) |
| Serial | generic | mouse | 3 | | | MR | MR | MR | 1 |
| None | | | | | | | | | 0 |

MOUSE RANKING SYSTEM FOR MULTIPLE USERS

CROSS REFERENCE TO RELATED CASES

The application is a continuation-in-part of U.S. Provisional Patent Appplication Ser. No. 60/132,926 filed May 6, 1999, the entire disclosure of which is incorporated by reference.

This application is also related, in part, to U.S. Provisional Patent Application Ser. No. 60/043,085, filed Apr. 8, 1997 entitled "Bi-phase Coded Computer Peripheral Extension System," the entire disclosure of which is incorporated herein by reference. This is also related to U.S. application Ser. No. 08/971,223, filed Nov. 15, 1997, entitled "A Method and Apparatus for Extending Computer Peripherals," the entire disclosure of which is incorporated herein by reference.

BACKGROUND AND SUMMARY OF THE INVENTION

FIELD OF THE INVENTION

This invention relates to computer switches, and more particularly to KVM switches for multiple users.

Available and well-known devices to provide communication capability between a single workstation (of, for example, a monitor, keyboard and mouse), and a number of computers. Such KVM switches are commercially available and are sold as the Commander and XP products manufactured by Cybex Computer Products Corporation of Huntsville, Ala. KVM switches offer the particular advantage that a large number of servers can be controlled and monitored by a single workstation, such that large computer operations, such as server farms and network administrator areas, can be used in a space-efficient manner to accommodate more computers and less workstations.

Some KVM switches can accommodate more than one user, including the XP switch. With the multi-user KVM switches, instead of just one user having access to many different attached computers multiple users can simultaneously access different computers in the system. In some such KVM switches, if two or more users need to access the same computer at the same time, they can share access through the KVM switch. Typically, in such sharing arrangements, each user receives the computer video signal, but only one user enters data at any given moment.

The KVM switch also acts as an interface between disparate computers and workstations. It is foreseeable, for example, that a workstation may have a certain type of keyboard and mouse that would be incompatible with one of the computers attached to the KVM switch if the keyboard/mouse were directly connected to the computer. For example, one type of keyboard available in the marketplace is the so-called PC keyboard, which is different in its data communication protocols than, for example, a so-called Sun keyboard. By design, PC keyboards operator according to a data protocol consistent with PC computers and Sun keyboards operate according to a different data protocol for Sun computers. If one were to hook-up a Sun keyboard to a PC computer, or a PC keyboard to a Sun computer, communications errors would result between the peripheral device and the computer. The KVM switch has a principle responsibility of ensuring compatibility with a variety of different keyboards and mouse and with a variety of different computers. Typically, KVM switches provide the functionality of translating keyboard/mouse data structures from their inherent type to a type desired by a selected computer, such that any keyboard/mouse type can communicate with any other computer type through the KVM switch. With KVM switches, a PC keyboard and mouse can operate a Sun server as easily as a Sun keyboard and mouse will operate an attached PC computer.

There are thus different types of computers that may be utilized with a KVM switch. The KVM switch has as one of its functions a translation of incompatible mouse protocols into compatible ones for the computer selected through the KVM switch. Such mouse types include, for example, Microsoft Intellimouse, IBM Scrollpoint, Logitech Mouse Man+, Logitech Marble+, Logitech MarbleFX and the Kensington Expert Mouse. There are, of course, many other mouse types available, and one can expect that many mouse types will be developed in the future that may come within the context of the present descriptions. That is, the present invention is not limited to any particular kind of mouse or any set of mice types, but will have applicability to many different mice types and many different sets of mice types within the context of the functionality of the present invention described herein.

In a typical system, a user is given an opportunity to select a mouse type (usually by selecting a mouse driver file associated with the mouse type) that the KVM switch can use to identify the mouse type and perform appropriate translations for the selected computer. In the present invention, the mouse type is determined by the KVM switch through a pattern of inquiry/response to a connected mouse which inquiries/responses are then compared to an hierarchical ranking structure to determine the mouse type of the connected mouse.

The present invention will also address problems associated with handling multiple different user mouse controllers used by multiple users into the same KVM switch. In such a case, the KVM switch must deal with the different kinds of mouse protocols for sending data that may exist between the two mouse controllers connected to the user input ports. Certain prior KVM switches have claimed to support all mouse controller types, but in reality only substitute a known mouse control protocol that may be a subset of an actual mouse protocol for the mouse attached to the input port. The mouse functionality ranking of the present invention identifies a particular method that effectively ranks mouse controllers based on certain identifiable features and then chooses a mouse protocol based on the "highest" ranking mouse protocol associated with the tested features.

Further, in accordance with one aspect of the present invention, the KVM switch provides flash memory availability into which the mouse ranking chart may be stored. Using flash memory, the mouse ranking protocols can be changed in accordance with new mouse protocol introductions (i.e., new third party mouse products being introduced into the market) so that the presently described KVM switch can continue to identify which mouse protocol is appropriate for even newly introduced mice connected to a KVM user port.

In essence, according to the preferred embodiment of the present invention, the KVM switch performs a hierarchical examination from the highest ranking mouse to the lowest ranking mouse to determine an appropriate protocol scheme being employed by a particular mouse so the KVM switch can communicate (or translate) that mouse scheme to the currently selected computer. The examination essentially is a set of questions that the KVM switch asks the mouse, beginning with the most elaborate protocol question, and ending with the decision that the mouse is simply a two button mouse. In the first instance, the KVM switch requests a response to an elaborate mouse protocol inquiry and then awaits a response from the mouse. If the mouse responds appropriately, the KVM switch concludes that the mouse is the elaborate type mouse. On the other hand, if the mouse does not respond appropriately, the KVM switch moves to the next level inquiry/response in the hierarchical examination.

As described above, the mouse drivers for the various types of mice that can be used with associated computers will vary depending on the mouse types connected to the input ports of the KVM switch. Just by way of example only, one such mouse, the so-called PS/2 mouse protocols are described in IBM PS/2 Mouse Technical Reference document, the entire contents of which are incorporated herein by reference. As described in that document, the PS/2 mouse protocol dictates certain command structures, data structures, error handling protocols, and data transmission characteristics, among other protocols. When a computer is compatible only with the PS/2 protocol (or an application is compatible only with the PS/2 protocol), the KVM switch must provide the computer with mouse commands translated to the PS/2 protocol in order to be effective, regardless of the mouse type that the KVM switch is actually receiving commands in accordance with.

BRIEF DESCRIPTION OF THE DRAWINGS

These, as well as other objects and advantages of this invention, will be more completely understood and appreciated by careful study of the following more detailed description of the presently preferred exemplary embodiment of the invention taken in conjunction with the accompanying drawings, of which.

DETAILED DESCRIPTION OF THE PRESENTLY PREFERRED EMBODIMENT

Figure 1:
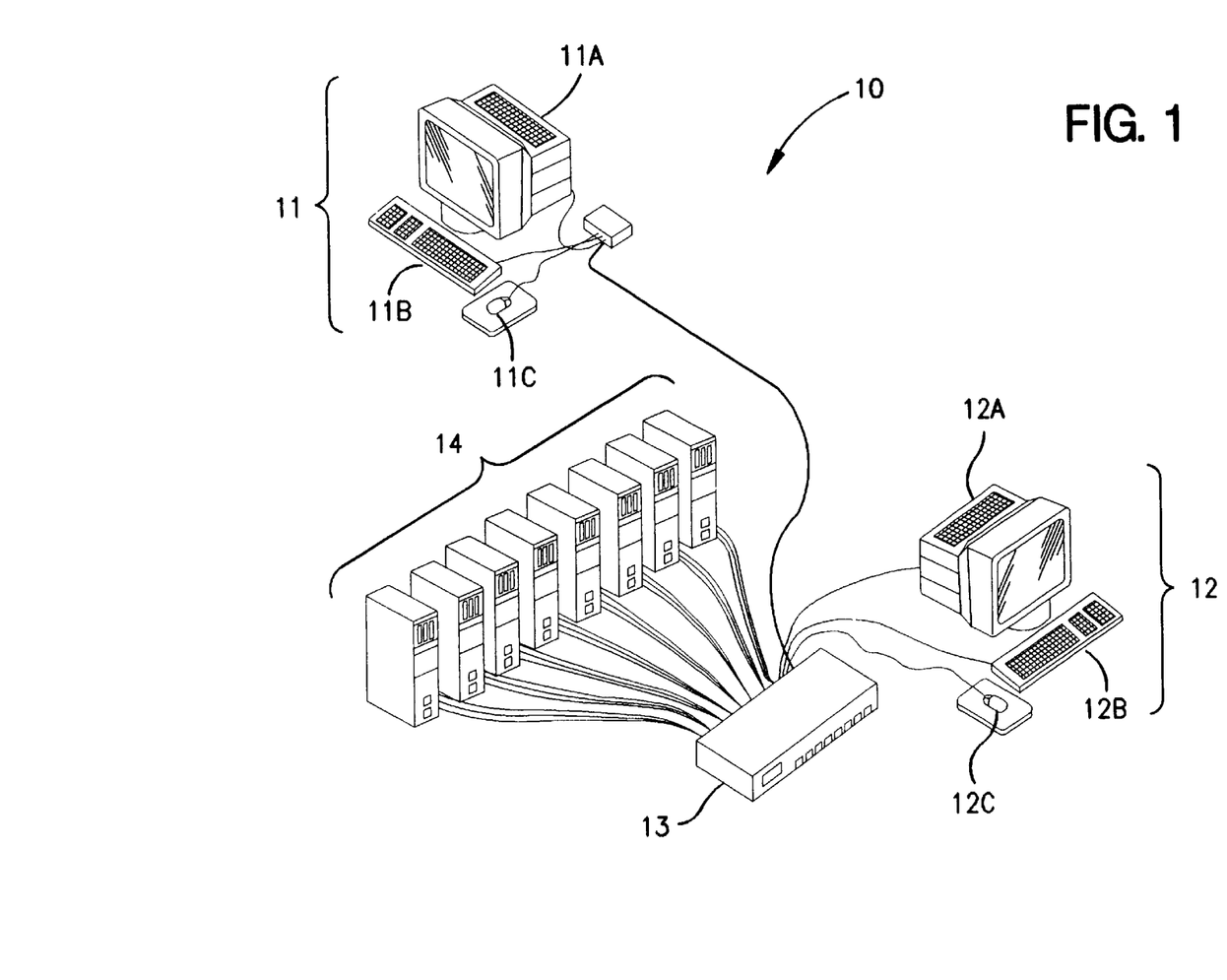
FIG. 1 is a schematic representation of a multi user, multi computer KVM switch system into which an embodiment of the present invention may be employed.

FIG. 1 illustrates a KVM system in which multiple users can access any of a number of computers simultaneously. The system 10 includes a first workstation 11 having monitor 11A, keyboard 11B, and mouse 11C, and second workstation 12 having monitor 12A, keyboard 12B, and mouse 12C. Each of the workstations 11 and 12 are connected into user ports of the KVM switch 13 communicates keyboard, video, and mouse signals from one or both of the workstations 11/12 to one or more of the computers 14 attached to computer ports of the KVM switch 13.

In the simplest example, only one user workstation (for example workstation 11) accesses only one of the computers 14. In such a case, the KVM switch 13 is responsible for identifying what type of mouse, keyboard, and monitor are being used in the workstation 11, and to identify the appropriate keyboard, mouse, and video drivers to the selected computers 14 so the respective peripheral devices of the workstation 11 can communicate with the selected computer 14. In some instances, the KVM switch 13 may be required to perform some translation functions to convert the KVM signals from the workstation 11 into a useable format for the selected computer 14.

When the KVM switch 13 is going to provide an additional functionality in which both workstation 11 and workstation 12 can simultaneously access a single computer 14, a unique problem arises. Specifically, if the mouse 11C of workstation 11 and mouse 12C of workstation 12 are different mouse types with different mouse specifications and different mouse data protocols, the KVM switch 13 must resolve which of the mouse specifications it will convey to the selected computer 14. Thus, if mouse 11C is a first type and mouse 12C is a second type, the KVM switch 13 may decide to convey mouse signals to the selected computer 14 in accordance with the first mouse type (of mouse 11C) and thus translate the mouse signals from the second mouse 12C into the first mouse type. Of course, a KVM switch 13 could just as easily choose the second mouse type (of mouse 12C) and thus translate the mouse data from the first mouse 11C into the second mouse type. The present invention addresses how the KVM switch 13 can optimize the decision it must make in choosing one of two disparate mouse types communicating with a single computer.

Figure 3:
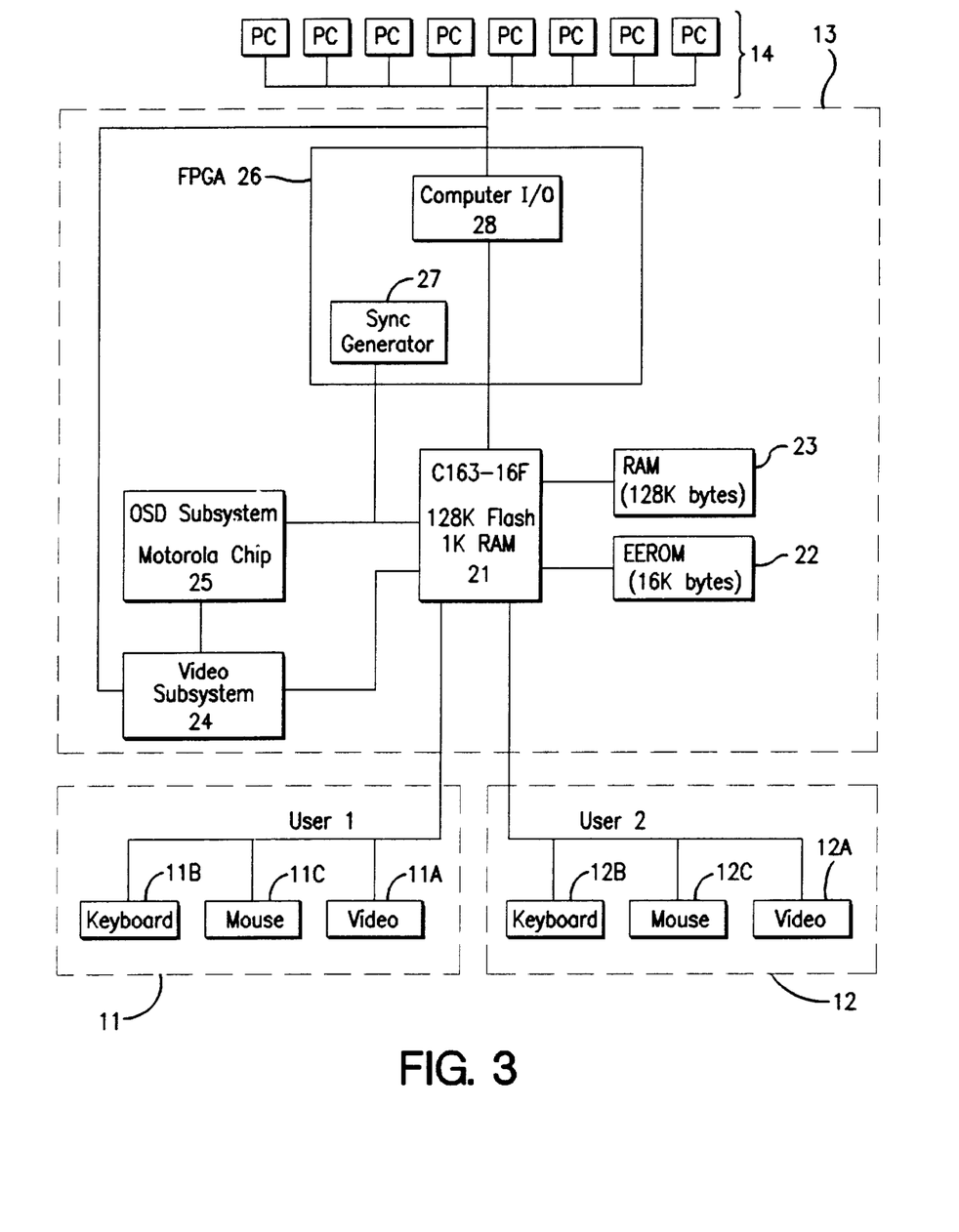
FIG. 3 is an electrical schematic diagram of a KVM switch into which an embodiment of the present invention may be employed.

FIG. 3 illustrates an example embodiment of the system 10 in further detail. As shown in FIG. 3, the first workstation 11 includes monitor 11A, keyboard 11B, and mouse 11C. Second workstation 12 includes monitor 12A, keyboard 12B, and mouse 12C. Both of the workstation signal sets are received by a single processor 21 of the KVM switch 13. The particular structure of the KVM switch 13 is not crucial to the present invention, but one example structure is described in more detail in U.S. Provisional Patent Application No. 60/132,926 filed May 6, 1999.

In the example embodiment of FIG. 3, the processor 21 includes internal flesh memory. External RAM 23 and ROM 22 also provide extra memory to the processor 21. Although not necessary for the implementation of the present invention, the KVM switch 13 may also include an on-screen display subsystem 25 and a video subsystem 24 communicating with the single processor 21 to provide overlaid menuing systems. Also in the example embodiment of FIG. 3, is a field programmable gate array 26 which will maintain the computer I/O system 28 and a sink generator 27 for internally generated video sinks. The computer I/O system 28 coordinates the transfer of KVM data to respective ones of the PCs 14.

The PS/2 mouse peripheral can issue data packets in several formats. The standard ⅔ button mouse sends 3 byte packets to the system. The "wheel" in the Microsoft Intellimouse has brought about the 4 byte data packet with the $4^{th}$ byte indicating the rotation of the wheel. Furthermore, Logitech's MouseMan+ and IBM's Scrollpoint have implemented their own wheel device yet do so by reverting back to a 3 byte packet utilizing the overflow bits in Byte 1 to indicate rotation of the wheel.

It is the goal of this embodiment that the peripheral side of the switch not be knowledgeable about the PC side in regard to peripheral devices versus PC device drivers. Mouse data must traverse through the switch unit (or tiers of switches) containing all the data received by the peripheral, regardless of capability, so that the computer interface module of the processor 21 software can supply the selected PC driver with the appropriate data. It is possible that the data received from the peripheral contains more attributes than the current selected PC driver needs. For example, an Intellimouse peripheral will send wheel data (4 bytes) but a standard PS/2 mouse driver on the selected PC can only consume 3 bytes. Due to the changing nature and unpredictability of the PS/2 mouse industry, the present invention provides a foundation to accommodate the mice currently in existence and hopefully future ones from a packet length and other mouse characterization perspective.

As described later with respect to FIG. 6, one aspect of the processor 21 includes various interface routines which determine the mouse types of the mice 11C and 12C of the workstations 11 and 12 and ranks those mice in accordance with a pre-determined hierarchy.

Figure 4:
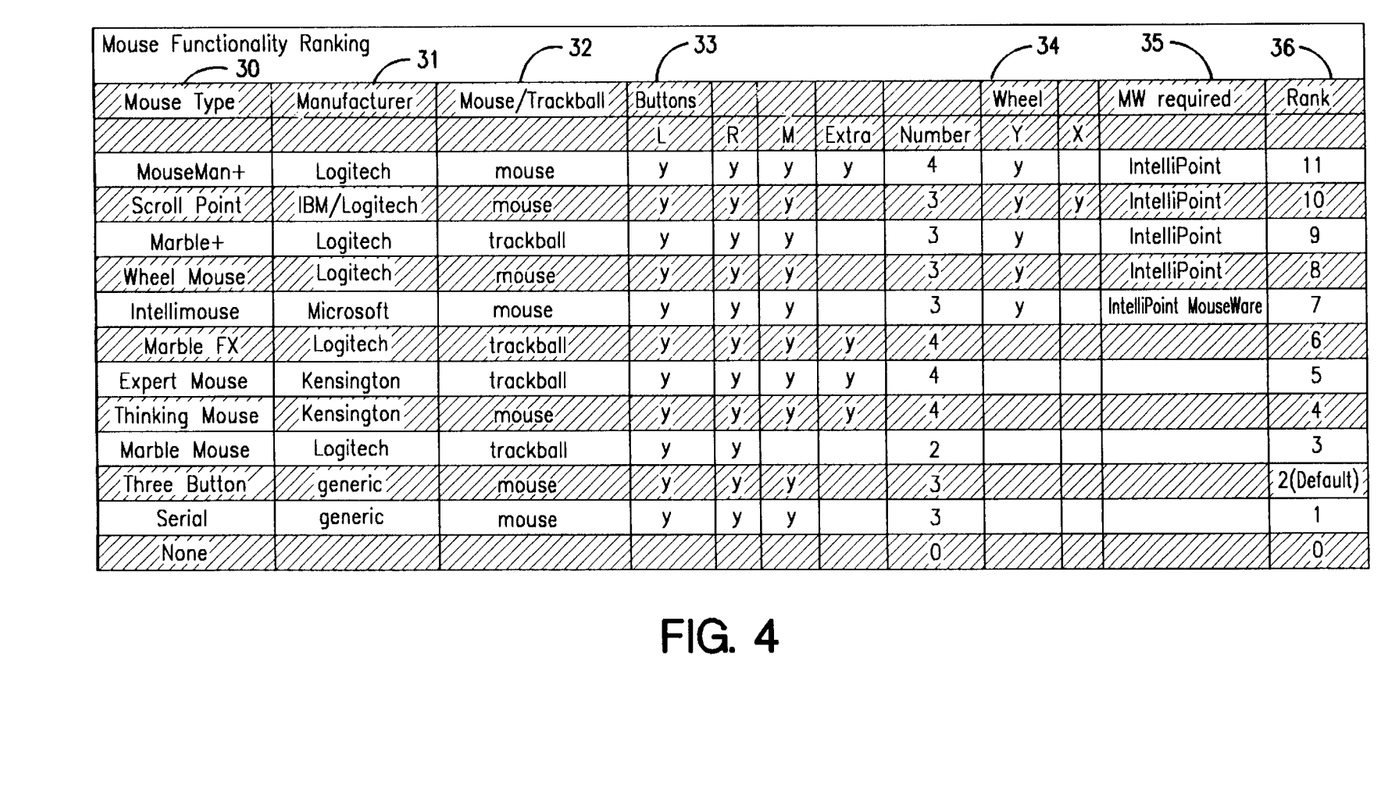
FIG. 4 is a first example embodiment of a mouse functionality ranking chart in accordance with the present invention.
Figure 5:
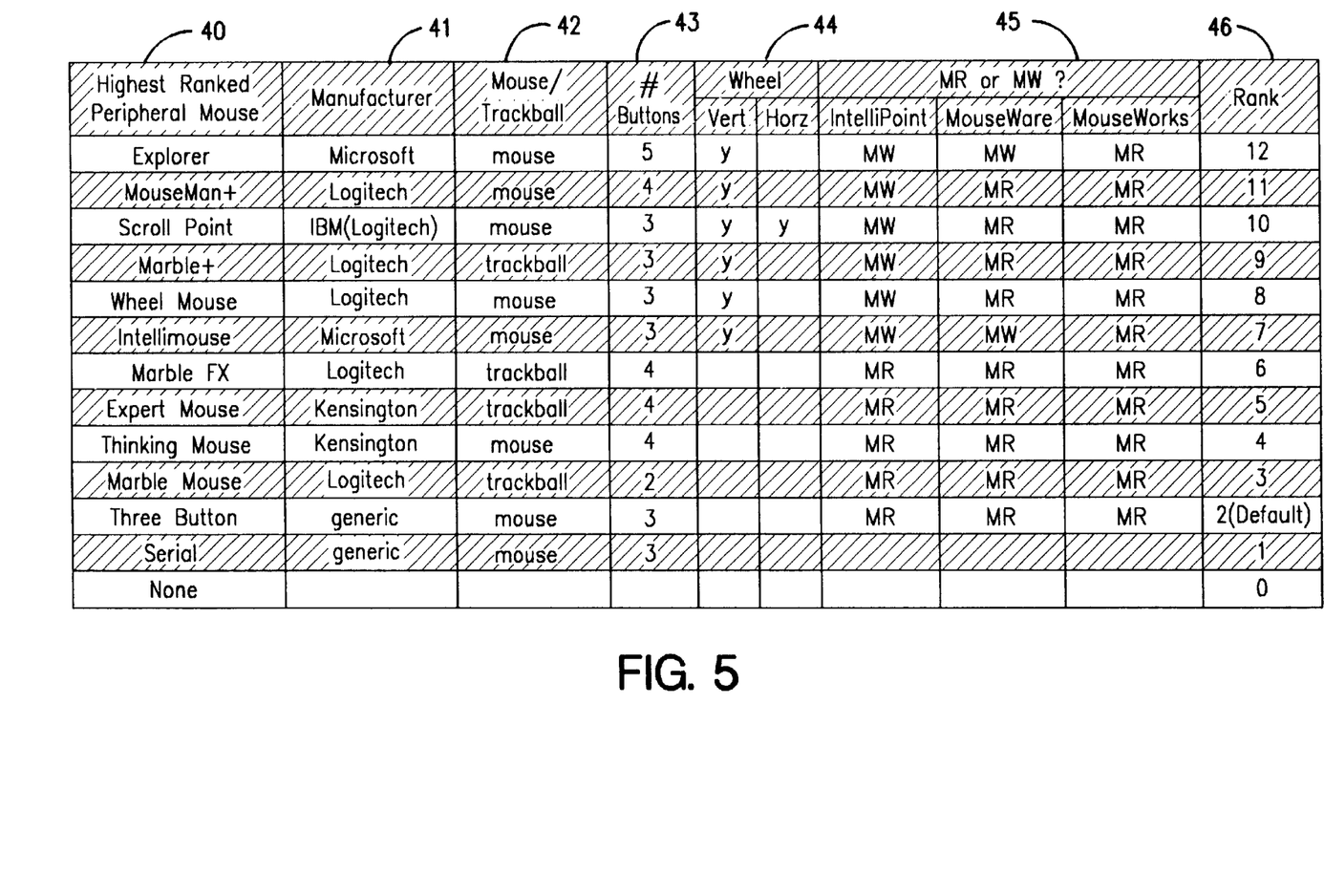
FIG. 5 is a second alternative embodiment of a mouse functionality ranking chart in accordance with the present invention.

The pre-determined hierarchy is shown in two example embodiments, respectively shown in FIGS. 4 and 5. The applicants notes that FIG. 4 is fully disclosed in the parent application Ser. No. 60/132,926 and that FIG. 5 is partially disclosed in that same parent application, which the only new matter of FIG. 5 being the "explorer" mouse outed as rank no. 12. The alternative embodiments of FIGS. 4 and 5 illustrate that the present invention is not limited to any specific set or subset of ranked mice but may be employed with any set or subset of mice. Further, FIG. 5 illustrates that, as new mice are introduced, the present invention can have equal application to the new mice by inserting the new mice specifications into the hierarchical ranking system.

Looking specifically at the embodiment of FIG. 4, various mouse types 30 are described, including Mouse Man Plus, ScrollPoint, Marble+, Wheelmouse, and Intellimouse, MarbleFX, Expert Mouse, Thinking Mouse, Marble Mouse, 3 Button Mouse, Serial Mouse, and no mouse. Each of the mouse types 30 is identified with a manufacturer of the mouse 31. In addition, each mouse type 30 is identified as having either a mouse or a track ball type structure. Each mouse type 30 can also be characterized in terms of the number and types of button 33 provided on the mouse. As the chart in FIG. 4 shows, each mouse type 30 includes a left button, and a right button. All of the mouse types 30 shown also include a middle button, with the exception of the "Marble Mouse." Thus, in the "number" column, identifying the number of buttons on each mouse type 30, one sees that the Marble Mouse has two buttons, and all other mouse types shown have three or four buttons. Those identified as having four buttons, also are shown as having the "extra" button in addition to the left, right and middle buttons.

In addition to the buttons 33, each mouse type 30 can also be identified as having (or omitting) a wheel 34. Further, mouse types 30 can have wheels 34 in the Y direction, the X direction, or both the X and Y directions. The chart in FIG. 4 illustrates which of the mouse types 30 have such X/Y wheels. In column 35 of FIG. 4, the MW required is identified. The MW required is provided only for those mice with a wheel and enables the mouse on the selected computer channel and activates the wheel mode (4 byte packets). In column 35, the reference to "IntelliPoint" refers to a standard Microsoft Intellimouse driver and the reference to "Mouseware" refers to a standard Logitech driver.

Finally, the mouse types 30 are ranked in column 36 based on the complexity of the mouse type 30. In the example of FIG. 4, all mice with wheels are ranked higher than those without. Further, within the categories of wheeled mice, the mice are further categorized based on the number of buttons provided, the existence of an X wheel, etc. Further, in the non-wheeled mouse types, there are further hierarchical breakdowns based on the number of buttons, the existence of a track ball, etc. Although the hierarchical structuring of FIG. 4 is not an exclusive arrangement of the present invention, the purpose of the hierarchical structure is to group the mouse types 30 according to defined characteristics that can be identified based on pre-determined inquiries. Thus, (referring again to FIG. 1) if the KVM switch 13 wishes to determine what types of mice are attached to its user ports in workstations 11 and 12, it begins a series of inquiries starting with an elaborate question and working its way down to more fundamental questions. For example, if the KVM switch 13 is employing the embodiment of FIG. 4, the first question it would logically ask both mice 11C and 12C is to provide a "wheel" response to a given stimulus signal. If a mouse 11C or 12C (or both) provide a coherent response to the stimulus signal, the KVM switch 13 can conclude that both mice have a wheel and thus fall within the FIG. 4 mouse rankings 7 through 11. The KVM switch 13 would then refine the questions further, such as asking for a response by an "X" wheel to a stimulus signal. A mouse that responds in accordance with the embodiment of FIG. 4 will be identified as the ScrollPoint mouse type 30 and receive the rank 36 of "10." A mouse that does not respond with a coherent response to the "X" wheel stimulus may be asked to respond to an "extra" button stimulus signal, or a track ball signal, etc., such that the KVM switch 13 will further narrow the mouse types attached to its user ports.

Once the KVM switch 13 has identified which mouse types the mice 11C and 12C are, it must determine which of the mouse types (if either) the KVM switch 13 will identify to the common selected computer 14. For that, the KVM switch 13 selects the highest ranking 36 of the two mouse types 30 of the mice 11C and 12C. In other words, if the KVM switch 13 determines that mouse 11C is a MarblePlus mouse type 30 and the mouse 12C is an Intellimouse mouse type 30, the KVM switch 13 will inform the common computer 14 that the driver types appropriate for the Marble-Plus mouse are being employed. That selection is made because the MarblePlus mouse type 30 has a rank of 9 (in rank column 36) versus the Intellimouse rank of 7.

In the preferred (but not exclusive) embodiment, the mouse ranking of FIG. 4 assigns the most complex mouse type 30 with the highest rank 36 and the least complex mouse type 30 with the lowest rank 36. This allows the most complex mouse to employ all of its button/wheel/trackball/etc. features with the commonly selected computer.

As shown in FIG. 4, the default rank 36 is for the 3 button generic mouse type 30. The serial mouse shown as rank no. 1 need not officially take part in the ranking. In other words, if the KVM switch fails to detect the mouse types 11C and 12C, it will default to emulating a 3 button generic mouse type 30. Thus, the KVM switch 13 via the single processor 21 polls the mice 11C and 12C to determine which mouse type 30 are being used in the workstations 11 and 12 and then determines the highest ranking mouse. The KVM switch 13 then emulates the highest ranking mouse to the commonly selected computer 14 for all mouse movements from either of the mice 11C or 12C. From a practical standpoint, this means that when a commonly selected computer 14 boots, the KVM switch 13 will emulate the highest ranking mouse when the computer mouse driver performs its mouse detection routines.

FIG. 5 illustrates another example embodiment of a mouse functionality ranking system in accordance with the present invention. In FIG. 5, the mouse types 40 are ranked from zero to 12 as shown in the rank column 46. As with FIG. 4, the mouse types 40 have associated manufacturers 41, mouse/trackball features 42, numbered buttons 43, presence of a wheel 44, and either or both of the vertical or horizontal directions in MR or MW requirements 45. In this disclosure, "MR" refers to a reset condition of a standard mouse and "MW" refers to a reset condition of a wheel mouse. In FIG. 5, the reference in column 45 to "IntelliPoint" refers to the Microsoft IntelliMouse driver, the reference to "Mouseware" refers to the Logitech driver, and the reference to "Mouseworks" refers to the standard Kensington driver. As shown in FIG. 5, for mice being used with the IntelliPoint Microsoft driver, all shown mice with wheels will use MW enabling the mouse on the selected computer channel to activate a wheel mode (for byte packets). If, on the other hand, the Logitech MouseWare driver is used, the MW mode is employed on only the Microsoft Explorer and IntelliMouse mice. Finally, if the Kensington Mouseworks driver is employed, no MW mode is used regardless of whether a wheel is present on the mouse.

As with the embodiment of FIG. 4, the embodiment of FIG. 5 ranks the mice 40 from highest complexity to lowest complexity. The ranking can take into account such factors as the presence of a wheel, the presence of a horizontal wheel, the number of buttons, the number of bytes, etc.

The embodiment shown in FIGS. 4 and 5 are by no means exclusive embodiments of the present invention but are representations of how the mouse ranking system of the present invention may be employed in example embodiments.

Further, the embodiment of FIG. 1 is not an exclusive embodiment for the present invention but other multi-user switch arrangements can have similar applicability to the present invention, including arrangements that do not use a traditional KVM switch box 13. Thus, networked arrangements in which multiple mice types may be accessing a single computer may also provide an appropriate platform for application of the present invention.

Figure 2:
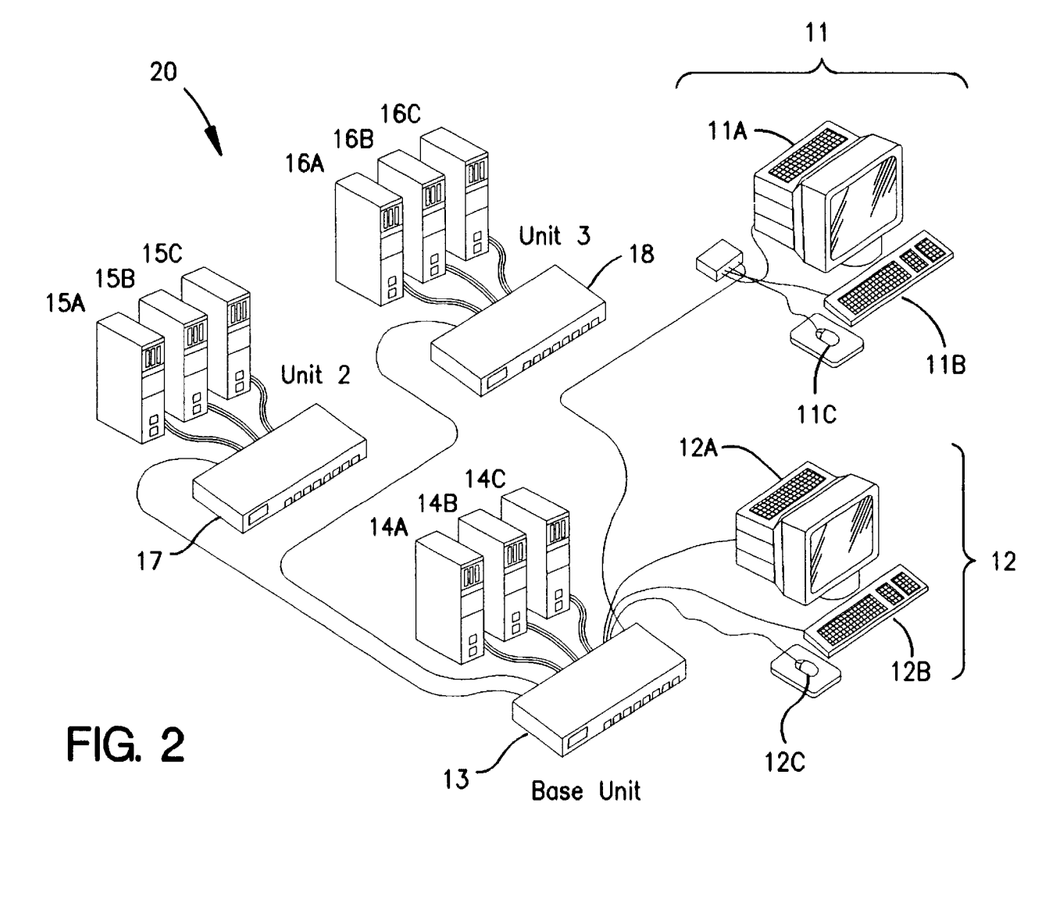
FIG. 2 is an alternative embodiment to FIG. 1, in which KVM switches are staled and employ an embodiment of the present invention.

In still another example system in which the present invention may have applicability is shown in FIG. 2. There, the workstations 11 and 12 connect to the user ports of a KVM switch 13. The KVM switch 13 is scaled by connecting to additional KVM switches 17 and 18. Each of the three KVM switches 13, 17, and 18 have respective sets of computers 14A–C, 15A–C, and 16A–C connected thereto. The system 20 of FIG. 2 thus provides computer access to each of the nine computers shown by either or both of the workstations 11 and 12. The embodiment of FIG. 2 is similar to the embodiment of FIG. 1 in that the KVM switch 13 makes the mouse ranking analysis. FIG. 2 differs from FIG. 1 in that the mouse signals may be relayed from the KVM switch 13 to a scaled KVM switch 17, 18, etc.

As shown in FIG. 3, the processor 21 of the KVM switch 13 includes internal flash memory. It can be expected that new mice types will be introduced in the future and other mouse ranking strategies can be developed from the teaching of the present invention. As those anticipated developments occur, the new mouse functionality ranking systems can be incorporated into an existing KVM switch via the flash memory of the processor 21. This provides a convenient and easy method of updating mouse functionality rankings in a KVM switch as new mice are introduced, etc.

Figure 6:
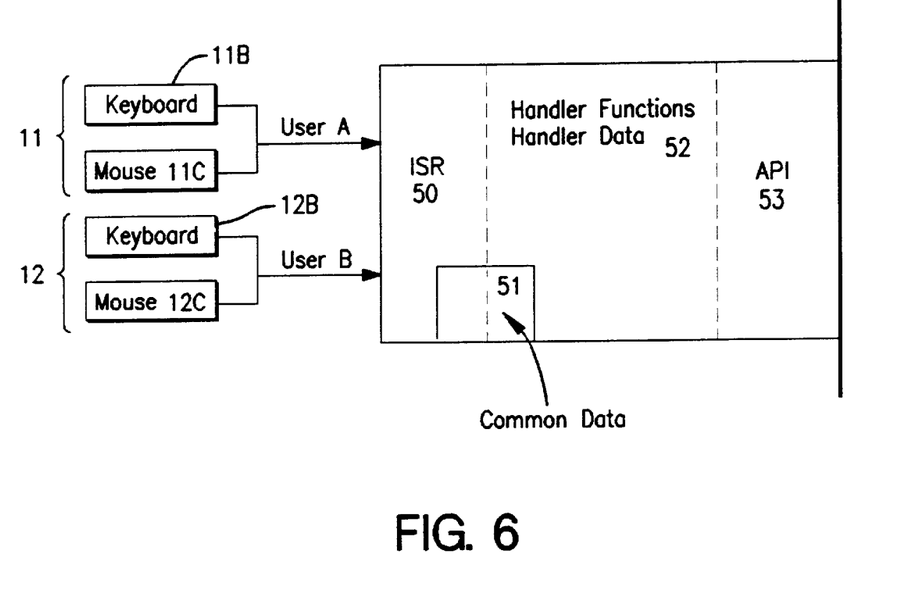
FIG. 6 is a functional block diagram of the mouse interfaces of a KVM switch employing a mouse functionality ranking system in accordance with the present invention.

FIG. 6 illustrates the software structures employed in the processor 21 (FIG. 3) for mouse handling. As shown in FIG. 6, workstations 11 and 12 include the mice 11C and 12C, respectively. In the embodiment of FIG. 6, software is designed in a compartmentalized fashion such that boundaries between software components are much like boundaries between separate physical hardware components. This is a design choice and is not necessarily required by the present invention. In the example embodiment of FIG. 6, the mouse data from the mice 11C and 12C are retrieved via interrupt service routines (ISR) 50. It is the responsibility of the ISR 50 to interact with the mice 11C and 12C by receiving and transmitting data to and from them. As data is received, it is put in a receive or response buffer, which may be loaded into a common data area 51. The exact methodology by which the ISR 50 retrieves data from multiple mice 11C and 12C is beyond the requirements of the present invention, but is described in detail in the underlying parent provisional application. As regards to the present invention, the ISR 50 can retrieve a mouse stimulus signal from the common data area 51 and provide that signal to the mice 11C and 12C. Expected response bytes are already loaded in common data area 51. When the response bytes are received from the mice 11C and 12C, the ISR 50 loads the mouse response bytes into a mouse buffer in the common data area 51 for further processing by the handler functions 52. In particular, the handler functions 52 will retrieve the mouse response data for the respective mice 11C and 12C and determine whether the mice responses are coherent responses to the stimulus signals provided to them. If they are, as described with respect to FIGS. 4 and 5 above, the handler 52 can determine whether the mice 11C and 12C have certain functional characteristics, thus allowing the handler 52 to narrow and refine its inquiries to the mice 11C and 12C to determine which types of mice 11C and 12C are present.

The ISR 50 will communicate certain mouse data types to the mice 11C and 12C, and will perform the following functions:

1. Initializing mouse operation for all user ports, including determining if a mouse device is active and resetting failed mouse interfaces, detecting the type of mouse device in operation and reporting this via a public API, and maintaining the keyboard's light status and typematic rates current with the latest values provided via the API.
2. Determining if there is at least 1 mouse packet available in the mouse buffer.
3. Retrieving one mouse packet from the mouse buffer, and uninhibiting the mouse as needed as a result of removing the packet.
4. Determining what type of device is attached to the mouse port, if any.
5. Setting the mouse scaling factor and remembering this value for later use if the mouse must be reconfigured due to hot plugging or mouse error.
6. Setting the mouse resolution and remembering this value for later use if the mouse must be reconfigured due to hot plugging or mouse error.
7. Setting the mouse sample rate and remembering this value for later use if the mouse must be reconfigured due to hot plugging or mouse error.

Thus, in FIG. 6, the handler functions in handler data 52 are a software section that calls tasks from a main task loop to provide specific peripheral processing. Finally, the application programming interface (API) 53 provides a mechanism for communication with other handlers in the processor software of the processor 21, such that as the handlers associated with the computer interfaces, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A KVM switch, comprising:

a switch processor to route KVM data between at least two selected workstations and at least one selected computer;

a first user port to receive first mouse signals from a first mouse of a first workstation, said first mouse having an associated first set of user input structures;

a second user port to receive second mouse signals from a second mouse of a second workstation, said second mouse having an associated second set of user input structures;

memory area containing a predetermined hierarchical mouse ranking for predetermined combinations of mice user input structures; and a mouse service subroutine to issue predetermined queries to the first mouse and the second mouse to determine, based on responses to the queries from the first mouse and the second mouse, what the corresponding first and second sets of user input structures are for, respectively, the first mouse and the second mouse, and further to issue emulated mouse instructions to the one selected computer using a selected one of the first and second sets of user input structures that is highest ranking in the predetermined hierarchical mouse ranking stored in the memory area.

2. A KVM switch as in claim 1 wherein the first and second user ports also receive first and second keyboard signals from first and second keyboards of the first and second workstations.

3. A KVM switch as in claim 1 wherein the first and second user ports also send first and second video signals to first and second monitors of the first and second workstations.

4. A KVM switch as in claim 1 wherein the first and second user input structures are identical.

5. A KVM switch as in claim 1 wherein the memory area is included in a common chip with the switch processor.

6. A KVM switch as in claim 1 wherein the memory area is embodied in flash memory.

7. A KVM switch as in claim 6 wherein the one selected computer further includes an external port in communication with the memory area to upgrade by external connection the predetermined hierarchical mouse ranking in the memory area.

8. A KVM switch as in claim 1 wherein the ranking is based on a relative complexity of user input structures associated with various mouse types.

9. A KVM switch as in claim 1 wherein the mouse user input structures in the predetermined combinations include at least one from the group consisting of:

a) left mouse button,
b) right mouse button,
c) middle mouse button,
d) extra mouse button,
e) number of total mouse buttons,
f) vertical mouse wheel,
g) horizontal mouse wheel, and
h) a mouse response byte size.

10. A method of emulating mouse instructions from two mice to a single computer, comprising the steps of:

issuing predetermined queries to the two mice relating to user input structures associated with the mice;

receiving responses or null responses from the two mice relating to each of the predetermined queries;

comparing the responses or null responses to a predetermined expected response to each query;

repeating the issuance of queries and receipt of responses until mouse types are determined for both mice;

pre-establishing a hierarchical ranking of various mouse types in accordance with relative complexities of the various mouse types; and sending mouse instructions received from both of the two mice according to a single selected mouse protocol corresponding to one mouse type of the two determined mouse types associated with a highest ranking mouse type in the hierarchical ranking.

11. A method as in claim 10 wherein the mouse type determined for at least one of the two mice is a default mouse type.

12. A method as in claim 10 further including the step of: translating instructions from at least one of the two mice into the single selected mouse protocol.

13. A method as in claim 10 wherein the predetermined queries are particular to at least one from the group consisting of:

a) left mouse button responses,
b) right mouse button responses,
c) middle mouse button responses,
d) extra mouse button responses,
e) number of total mouse buttons,
f) vertical mouse wheel responses,
g) horizontal mouse wheel responses, and
h) a mouse response byte sizes.

14. A method as in claim 10 wherein the pre-establishing step includes:

ascertaining a complexity level associated with each mouse type based on a set of predetermined mouse input characteristics; and ranking the mice according to the relative complexity levels ascertained for each mouse.

15. A method as in claim 10 wherein the pre-establishing step further includes the step of loading the hierarchical ranking into flash memory.

16. A method as in claim 14 further including the steps of:

providing a peripheral computing device port to communicate with the flash memory; and changing the hierarchical ranking through the peripheral computing device port.

* * * * *